() United States Patent  
Chen et al.

(10) Patent No.: US 10,782,447 B2  
(45) Date of Patent: Sep. 22, 2020

(54) SEA FOG MONITORING METHOD BASED ON MULTI-SOURCE SATELLITE REMOTE SENSING DATA

(71) Applicant: Jiangsu Meteorological Observatory, Nanjing, Jiangsu (CN)

(72) Inventors: Hao Chen, Jiangsu (CN); Zhenzhen Xie, Jiangsu (CN); Chao Li, Jiangsu (CN); Zhiming Kang, Jiangsu (CN)

(73) Assignee: Jiangsu Meteorological Observatory (CN)

( * ) Notice: Subject to any disclaimer, the term of this patent is extended or adjusted under 35 U.S.C. 154(b) by 116 days.

(21) Appl. No.: 16/167,458

(22) Filed: Oct. 22, 2018

(65) Prior Publication Data

US 2019/0331831 A1 Oct. 31, 2019

(30) Foreign Application Priority Data

Apr. 26, 2018 (CN) .......................... 2018 1 0382620

(51) Int. Cl.
*G01W 1/08* (2006.01)
*G01S 17/95* (2006.01)
*G01S 19/14* (2010.01)

(52) U.S. Cl.
CPC .............. *G01W 1/08* (2013.01); *G01S 17/95* (2013.01); *G01S 19/14* (2013.01)

(58) Field of Classification Search
CPC ........... G01W 1/14; G01W 1/00; G01W 1/08; G01W 1/02; G01W 1/10; G01W 1/04; G01W 1/06; G01W 1/12; G01W 1/16; G01W 2001/003; G01W 2001/006; G01W 2203/00; B60S 1/0822; B60S 1/0825; B60S 1/0818; B60S 1/0888; B60S 1/0859; B60S 1/0866; B60S 1/087; B60S 1/0491; B60S 1/0833; B60S 1/0837; B60S 1/0881; B60S 1/0892
USPC ......................................... 73/170.16–170.28
See application file for complete search history.

(56) References Cited

U.S. PATENT DOCUMENTS

| | | | |
|---|---|---|---|
| 6,237,405 B1 * | 5/2001 | Leslie ................... | G01J 5/0014 73/170.07 |
| 2006/0164063 A1 * | 7/2006 | Solheim ............... | G01K 11/006 324/76.14 |
| 2020/0103553 A1 * | 4/2020 | Jiang ...................... | G01W 1/10 |

FOREIGN PATENT DOCUMENTS

| | | | | |
|---|---|---|---|---|
| CN | 109375290 A | * | 2/2019 | |
| WO | WO-2019101247 A2 | * | 5/2019 | ........... G01S 7/4817 |

* cited by examiner

*Primary Examiner* — Andre J Allen

(57) ABSTRACT

The present invention discloses a sea fog monitoring method based on multi-source satellite remote sensing data. A fog and low cloud mixed region is preliminarily identified using visible light and infrared satellite remote sensing data. A temperature and humidity vertically-layered structure in the fog and low cloud mixed region is obtained using satellite microwave remote sensing data. Due to different heights of fog and low cloud high-humidity regions, the heights of the high-humidity regions can be extracted by a humidity layered structure, so that fog and low clouds are distinguished, and the monitoring accuracy of fog is effectively improved.

9 Claims, 2 Drawing Sheets

SEA FOG MONITORING METHOD BASED ON MULTI-SOURCE SATELLITE REMOTE SENSING DATA

FIELD

The present invention relates to a sea fog monitoring method based on multi-source satellite remote sensing data, belonging to the technical field of meteorological monitoring.

BACKGROUND

Sea fog is a low-visibility weather phenomenon (the visibility is less than 1 km) on the sea, and has a significant influence on marine national economic production activities such as port operations, ocean transportation, and fishery production. Therefore, it is very important to monitor the sea fog. Because there is a lack of observation data on the sea, sea fog distribution monitoring information within a large sea area cannot be directly obtained by means of visibility observation. Satellite remote sensing technology has high temporal and spatial resolution, has broad observation coverage, can implement quick observation a large sea area and extraction of sea fog information, and is one of important means of sea fog monitoring. Satellite remote sensing has a plurality of probe wave bands, and it is common to use visible light and infrared bands for the monitoring, identification, and information extraction of sea fog.

At present, in all sea fog monitoring technologies developed using a visible light and infrared remote sensing technology, the determination of whether a fog region or a cloud region exists is performed using image information gray values of a fog layer or a cloud layer. For visible light and infrared remote sensing satellite observation data, it is unable to penetrate the fog layer and the cloud layer, and only cloud top and fog top information can be observed. When the cloud layer is relatively low or relatively thick, the visible light and infrared observation characteristics of the fog top and the cloud top are relatively approximate, the cloud top and fog top information will be confused, and thus low clouds and fog cannot be effectively distinguished, and the result of erroneously determining the low clouds as fog will be caused.

SUMMARY

To solve the technical problem above, the present invention provides a sea fog monitoring method based on multi-source satellite remote sensing data.

To achieve the purpose above, the present invention adopts the following technical solutions.

A sea fog monitoring method based on multi-source satellite remote sensing data, including the following steps:
gridding visible light and infrared remote sensing data in satellite data, the visible light and infrared remote sensing data including visible light remote sensing data and infrared remote sensing data;
gridding microwave remote sensing data in the satellite data;
interpolating the gridded microwave remote sensing data to a grid that is the same as the gridded visible light and infrared remote sensing data;
dividing the gridded visible light and infrared remote sensing data into time-based daytime data and time-based nighttime data;
dividing detected daytime sky conditions into "fog, fog and low clouds, and low clouds" and "clear sky or high clouds" by using a visible light and infrared fog detection algorithm based on the time-based daytime data;
dividing detected nighttime sky conditions into "fog, fog and low clouds, and low clouds" and "clear sky or high clouds" by using an infrared fog detection algorithm based on the time-based nighttime data;
dividing a "fog, low clouds and fog, and low clouds" region into "low clouds, low clouds and fog" and "fog" regions by using a Laplace operator detection method based on the detected infrared remote sensing data of a "fog, fog and low clouds, and low clouds" region;
performing inversion by using a temperature and humidity profile inversion algorithm based on the interpolated gridded microwave remote sensing data to obtain a three-dimensional temperature and humidity field; and
dividing the "low clouds, low clouds and fog" region into "low clouds" and "low clouds and fog" regions by using a three-dimensional temperature and humidity field fog detection method.

The microwave remote sensing data includes a microwave remote sensing radiation brightness temperature; the infrared remote sensing data includes an infrared remote sensing radiation brightness temperature; and the visible light remote sensing data includes a visible light remote sensing reflectivity.

The data is preprocessed before the data is gridded, specifically as follows:
if a calibration coefficient of the microwave remote sensing radiation brightness temperature is given, calibrating the microwave remote sensing radiation brightness temperature, or else, reading the microwave remote sensing radiation brightness temperature, longitude and latitude directly;
if a calibration coefficient of the infrared remote sensing radiation brightness temperature is given, calibrating the infrared remote sensing radiation brightness temperature, or else, reading the infrared remote sensing radiation brightness temperature, longitude and latitude directly; and
if a calibration coefficient of visible light remote sensing reflectivity data is given, calibrating the visible light remote sensing reflectivity, or else, reading the visible light remote sensing reflectivity, longitude and latitude directly.

The process of gridding the visible light and infrared remote sensing data includes:
constructing an infrared remote sensing data grid, and filling the infrared remote sensing data grid with the infrared remote sensing radiation brightness temperature according to the corresponding longitude and latitude thereof, and
constructing a visible light remote sensing data grid, and filling the visible light remote sensing data grid with the visible light remote sensing reflectivity according to the corresponding longitude and latitude thereof.

The process of gridding the microwave remote sensing data includes: constructing microwave remote sensing data, and filling the microwave remote sensing data with the microwave remote sensing radiation brightness temperature according to the corresponding longitude and latitude thereof.

For time-based daytime data in a certain region, when the reflectivity of a 650 nm channel is greater than 0.2 and the radiation brightness temperature of a 11.7 μm channel is greater than 270 K, it can be determined that the daytime sky conditions of the region are "fog, fog and low clouds, and low clouds", or else, the daytime sky conditions of the region are "clear sky or high clouds".

For gridded nighttime infrared remote sensing data in a certain region, a difference ΔR between radiation values of dual channels is calculated by using a dual-channel difference method; when ΔR is greater than 2 K, it is determined that the nighttime sky conditions of the region are "fog, fog and low clouds, and low clouds", or else, the nighttime sky conditions of the region are "clear sky or high clouds".

Laplace operator calculation is performed on the infrared remote sensing data of the "fog, fog and low clouds, and low clouds" regions, and threshold analysis is performed on the obtained operator; when the obtained operator is greater than 0.1, it is determined that there are low clouds in a region, or else, there is no low cloud in the region.

The three-dimensional temperature and humidity field of the "low clouds, low clouds and fog" region is selected to calculate the relative humidity distribution of each layer by means of the temperature and humidity corresponding to the same atmospheric stratification, and whether there is fog in the region is determined according to relative humidity.

The present invention achieves the following beneficial effects: in the present invention, a fog and low cloud mixed region is preliminarily identified using visible light and infrared satellite remote sensing data. A temperature and humidity vertically-layered structure in the fog and low cloud mixed region is obtained using satellite microwave remote sensing data. Due to different heights of fog and low cloud high-humidity regions, the heights of the high-humidity regions can be extracted by a humidity layered structure, so that fog and low clouds are distinguished, thereby effectively improving the monitoring accuracy of fog.

DETAILED DESCRIPTION

The present invention is further descried blow in combination with the accompanying drawings. The following embodiments are merely used for more clearly describing the technical solutions of the present invention, but are not intended to limit the scope of protection of the present invention.

Figure 1:
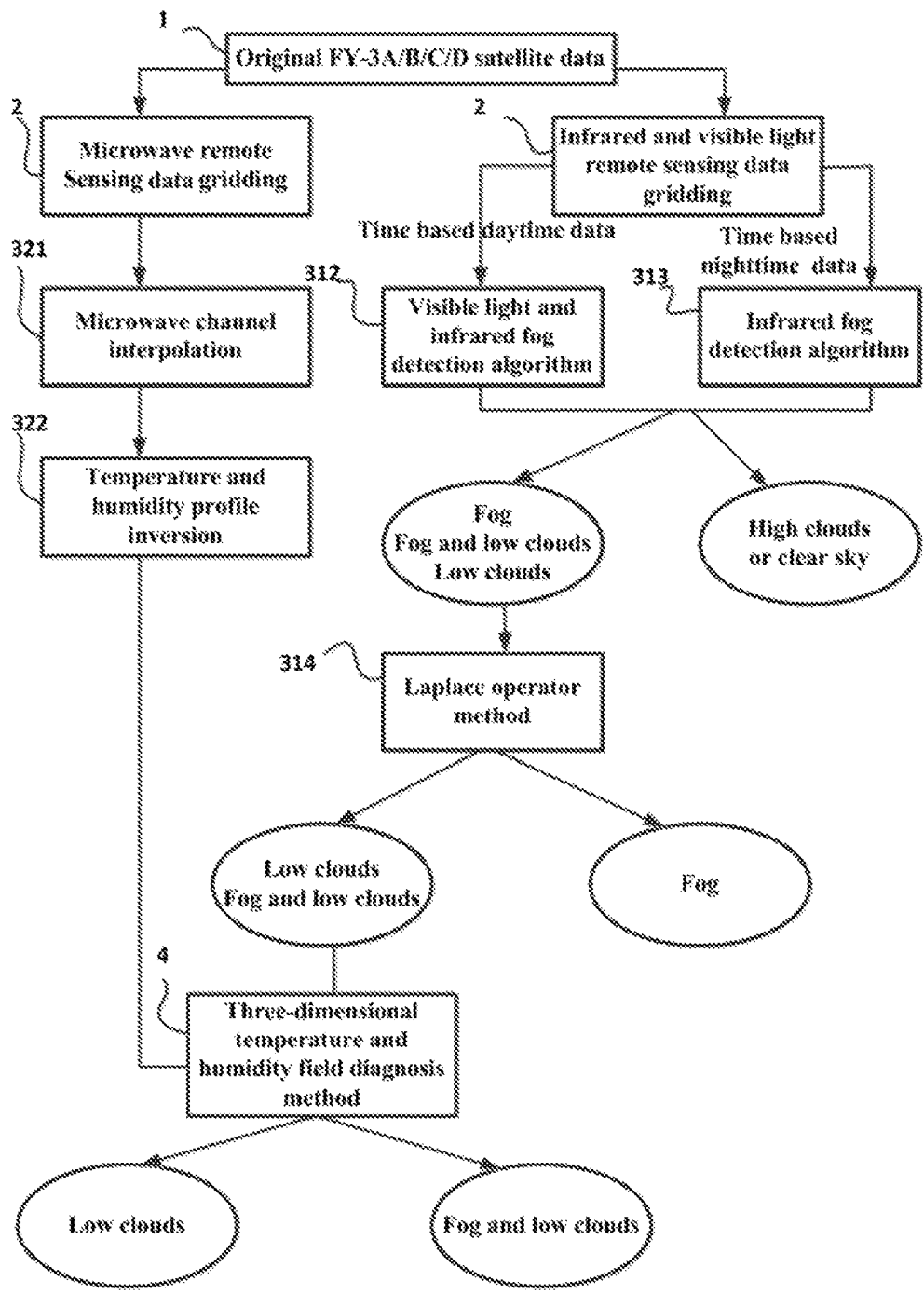
FIG. 1 is a flow chart of the present invention.

As shown in FIG. 1, a sea fog monitoring method based on multi-source satellite remote sensing data, including the following steps.

1) Preprocess satellite data.

The satellite data is visible light and infrared remote sensing data and microwave remote sensing data carried by FY-3 series satellites, NOAA series satellites, or other polar orbit and stationary orbit satellites that carry both visible light and infrared and microwave remote sensing instruments.

The microwave remote sensing data includes a microwave remote sensing radiation brightness temperature; the visible light and infrared remote sensing data includes visible light remote sensing data and infrared remote sensing data; the infrared remote sensing data includes an infrared remote sensing radiation brightness temperature, and the visible light remote sensing data includes a visible light remote sensing reflectivity.

If a calibration coefficient of the microwave remote sensing radiation brightness temperature is given in an official technical manual, the microwave remote sensing radiation brightness temperature is calibrated, or else, the microwave remote sensing radiation brightness temperature, longitude and latitude are read directly; if a calibration coefficient of the infrared remote sensing radiation brightness temperature is given in the official technical manual, the infrared remote sensing radiation brightness temperature is calibrated, or else, the infrared remote sensing radiation brightness temperature, longitude and latitude are read directly; and if a calibration coefficient of visible light remote sensing reflectivity data is given in the official technical manual, the visible light remote sensing reflectivity is calibrated, or else, the visible light remote sensing reflectivity, longitude and latitude are read directly.

2) Grid the visible light and infrared remote sensing data, and grid the microwave remote sensing data.

The process of gridding the visible light and infrared remote sensing data is as follows:

Construct a 0.01° horizontal resolution infrared remote sensing data grid, and fill the infrared remote sensing data grid with the infrared remote sensing radiation brightness temperature according to the corresponding longitude and latitude thereof; and if one grid is filled with more than one infrared remote sensing radiation brightness temperature, average all the data filling the grid.

Construct a 0.01° horizontal resolution visible light remote sensing data grid, and fill the visible light remote sensing data grid with the visible light remote sensing reflectivity according to the corresponding longitude and latitude thereof; and if one grid is filled with more than one visible light remote sensing reflectivity, average all the data filling the grid.

The process of gridding the microwave remote sensing data includes:

Construct 0.1° horizontal resolution microwave remote sensing data, and fill the microwave remote sensing data with the microwave remote sensing radiation brightness temperature according to the corresponding longitude and latitude thereof; and if one grid is filled with more than one microwave remote sensing radiation brightness temperature, average all the data filling the grid.

3) Process the gridded visible light and infrared remote sensing data and the gridded microwave remote sensing data.

The gridded visible light and infrared remote sensing data is processed as follows:

311) divide the gridded visible light and infrared remote sensing data into time-based daytime data and time-based nighttime data;

312) divide detected daytime sky conditions into "fog, fog and low clouds, and low clouds" and "clear sky or high clouds" by using a visible light and infrared fog detection algorithm based on the time-based daytime data; the visible light and infrared fog detection algorithm is an algorithm of detecting whether fog exists by jointly using the visible light remote sensing reflectivity and the infrared remote sensing radiation brightness temperature;

for the time-based daytime data in a certain region, when the reflectivity of a 650 nm channel is greater than 0.2 and the radiation brightness temperature of a 11.7 μm channel is greater than 270 K, it can be determined that the daytime sky conditions of the region are "fog, fog and low clouds, and low clouds", or else, the daytime sky conditions of the region are "clear sky or high clouds";

313) divide detected nighttime sky conditions into "fog, fog and low clouds, and low clouds" and "clear sky or high clouds" by using an infrared fog detection algorithm based on the time-based nighttime data; the infrared fog detection algorithm is an algorithm of detecting whether fog exists by using the infrared remote sensing radiation brightness temperature;

for gridded nighttime infrared remote sensing data in a certain region, a difference ΔR between radiation values of dual channels is calculated on the basis of the radiation values of short wave infrared 3.8 μm and long wave infrared 10.8 μm dual channels by using a dual-channel difference method; when ΔR is greater than 2 K, it is determined that the nighttime sky conditions of the region are "fog, fog and low clouds, and low clouds", or else, the nighttime sky conditions of the region are "clear sky or high clouds";

314) divide a "fog, low clouds and fog, and low clouds" region into "low clouds, low clouds and fog" and "fog" regions by using a Laplace operator detection method based on the detected infrared remote sensing data of a "fog, fog and low clouds, and low clouds" region.

Compared with fog, clouds are usually more undulate and the texture is more uneven. Therefore, Laplace operator calculation is performed on the infrared remote sensing radiation brightness temperature of the region, specifically as follows:

$$c_{i,j} = \nabla^2 (Tb_{i,j}) = \frac{\partial^2 (Tb_{i,j})}{\partial^2 x} + \frac{\partial^2 (Tb_{i,j})}{\partial^2 y} = Tb_{i,j-1} + Tb_{i,j+1} + Tb_{i-1,j} + Tb_{i+1,j} - 4Tb_{i,j}$$

where $c_{i,j}$ is an operator; i and j are respectively row and column positions of a grid point needing to be calculated; i−1 and i+1 are respectively the previous row and the next row of the row where the grid point needing to be calculated is located; j−1 and j+1 are respectively the previous column and the next column of the column where the grid point needing to be calculated is located; and $Tb_{i,j}$ represents the infrared remote sensing radiation brightness temperature of the grid point needing to be calculated;

when $c_{i,j}$ is greater than 0.1, it can be determined that there are low clouds in the region, and when $c_{i,j}$ is less than or equal to 0.1, it is determined that there is no low cloud in the region.

Figure 2:
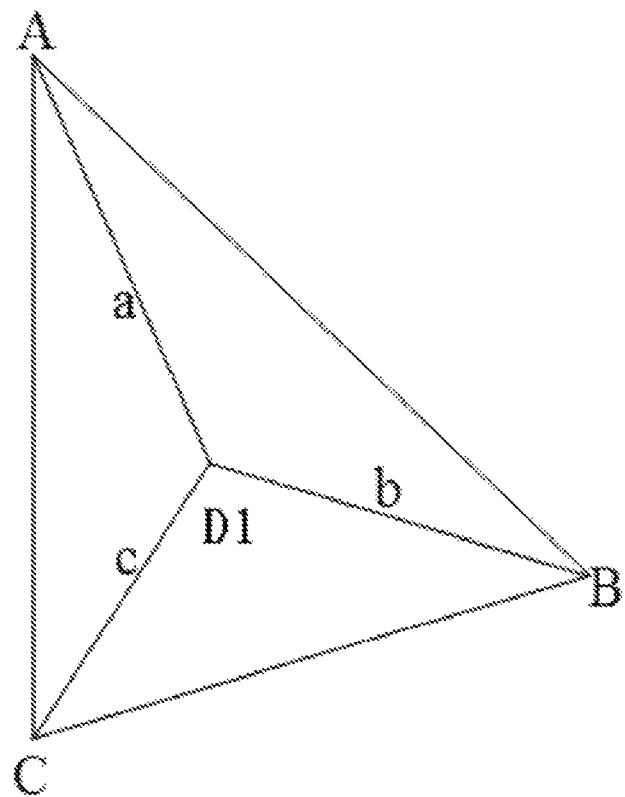
FIG. 2 is a trigonometric interpolation map.

The gridded microwave remote sensing data is processed as follows:

321) interpolate the gridded microwave remote sensing data to a grid that is the same as the gridded visible light and infrared remote sensing data;

that is, the gridded microwave remote sensing data is interpolated to a 0.01° horizontal resolution grid, the interpolation is performed by using a trigonometric interpolation method, and the specific method is as shown in FIG. 2 below:

for any point D1 needing brightness temperature reconstruction in the figure, three sampling points that are closest to the point D1 can be found to form a triangle; A, B, and C are vertices of the triangle; a, b, and c are respectively distances from the point D1 needing reconstruction to the three vertices A, B, and C. Hence, the microwave remote sensing radiation brightness temperature $T_b^D$ at the position of the point D1 can be obtained, according to the microwave radiation brightness temperatures $T_b^A$, $T_b^B$, and $T_b^C$ of the three points A, B, and C, the distance a between A and D1, the distance b between B and D1, and the distance c between C and D1, by calculation according to the following formula:

$$T_b^{D1} = T_b^A \times \frac{b+c}{2(a+b+c)} + T_b^B \times \frac{a+c}{2(a+b+c)} + T_b^C \times \frac{a+b}{2(a+b+c)}$$

after the gridded microwave remote sensing data is interpolated to the 0.01° horizontal resolution grid, the gridded microwave remote sensing data and the gridded visible light and infrared remote sensing data can be matched one to one;

322) perform inversion by using a temperature and humidity profile inversion algorithm based on the interpolated gridded microwave remote sensing data to obtain a three-dimensional temperature and humidity field;

temperature and humidity profiles of each grid point in the region to be determined are calculated by using a D matrix method; historical statistical averages <B$_1$> and <B$_2$> of the temperature and humidity profiles, and a historical statistical average <A> of the microwave remote sensing radiation brightness temperature are pre-calculated; the three parameters are used as input parameters of inverted temperature and humidity profiles; and in the region needing to be determined, the gridded microwave remote sensing radiation brightness temperature data A of each unit is used, $$B_1 = \overline{D}_1 \cdot (A - \langle A \rangle) + \langle B_1 \rangle$$

$$B_2 = \overline{D}_2 \cdot (A - \langle A \rangle) + \langle B_2 \rangle$$

the temperature and humidity profiles $B_1$ and $B_2$ of each unit can be separately obtained by inversion. $D_1$ and $D_2$ can be calculated according to the following formula:

$$D_1 \text{ or } D_2 = \overline{C}(p,d) \cdot (\overline{C}(d,d) + \overline{R})^{-1}$$

where $\overline{C}(p,d)$ is a covariance matrix of a historical statistical temperature (corresponding to $D_1$)/humidity (corresponding to $D_2$) array p of multiple air pressure layers and corresponding multi-channel microwave remote sensing radiation brightness temperature data d; temperature/humidity profile data in approximately one month of a coastal radiosonde station that is closest to the region needing to be determined, and microwave remote sensing radiation brightness temperature observation data of polar-orbiting satellites on the radiosonde station are selected as historical statistical data; $\overline{C}(d,d)$ is an auto-covariance matrix of the multi-channel microwave remote sensing radiation brightness temperature data d, and $\overline{R}$ is a diagonal matrix formed by squares of channel measurement errors.

4) Utilize the three-dimensional temperature and humidity field (i.e., an algorithm of detecting whether fog exists using the three-dimensional temperature and humidity field) to divide the "low clouds, low clouds and fog" region into "low clouds" and "low clouds and fog" regions by using a three-dimensional temperature and humidity field fog detection method.

The three-dimensional temperature and humidity field of the "low clouds, low clouds and fog" region is selected to calculate the relative humidity distribution of each layer by means of the temperature and humidity corresponding to the same atmospheric stratification, and whether there is fog in the region is determined according to relative humidity. First, 1000 hPa relative humidity is determined; if the relative humidity is greater than or equal to 90%, it is determined that there is fog; if the 1000 hPa relative humidity is less 90%, 925 hPa relative humidity is determined; if the 925 hPa relative humidity is greater than or equal to 90%, it is also determined that there is fog; if the 925 hPa relative humidity is also less than 90%, it is determined that there is no fog in the region.

In the method above, a fog and low cloud mixed region is preliminarily identified using visible light and infrared satellite remote sensing data. A temperature and humidity vertically-layered structure in the fog and low cloud mixed region is obtained using satellite microwave remote sensing data. Due to different heights of fog and low cloud high-humidity regions, the heights of the high-humidity regions can be extracted by a humidity layered structure, so that fog and low clouds are distinguished, thereby effectively improving the monitoring accuracy of fog.

The above are only preferred embodiments of the present invention. It should be noted that many modifications and variations can be made thereto for a person skilled in the art without departing from the technical principle of the present invention, and those modifications and variations should also be regarded as falling within the scope of protection of the present invention.

What is claimed is:

1. A sea fog monitoring method based on multi-source satellite remote sensing data, comprising the following steps:
    gridding visible light and infrared remote sensing data in satellite data, the visible light and infrared remote sensing data comprising visible light remote sensing data and infrared remote sensing data;
    gridding microwave remote sensing data in the satellite data;
    interpolating the gridded microwave remote sensing data to a grid that is the same as the gridded visible light and infrared remote sensing data;
    dividing the gridded visible light and infrared remote sensing data into time-based daytime data and time-based nighttime data;
    dividing detected daytime sky conditions into "fog, fog and low clouds, and low clouds" and "clear sky or high clouds" by using a visible light and infrared fog detection algorithm based on the time-based daytime data;
    dividing detected nighttime sky conditions into "fog, fog and low clouds, and low clouds" and "clear sky or high clouds" by using an infrared fog detection algorithm based on the time-based nighttime data;
    dividing a "fog, low clouds and fog, and low clouds" region into "low clouds, low clouds and fog" and "fog" regions by using a Laplace operator detection method based on the detected infrared remote sensing data of a "fog, fog and low clouds, and low clouds" region;
    performing inversion by using a temperature and humidity profile inversion algorithm based on the interpolated gridded microwave remote sensing data to obtain a three-dimensional temperature and humidity field; and
    dividing the "low clouds, low clouds and fog" region into "low clouds" and "low clouds and fog" regions by using a three-dimensional temperature and humidity field fog detection method.

2. The sea fog monitoring method according to claim 1, wherein,
    the microwave remote sensing data comprises a microwave remote sensing radiation brightness temperature;
    the infrared remote sensing data comprises an infrared remote sensing radiation brightness temperature; and
    the visible light remote sensing data comprises a visible light remote sensing reflectivity.

3. The sea fog monitoring method according to claim 2, wherein,
    before gridding the data, the data is preprocessed, specifically as follows:
    if a calibration coefficient of the microwave remote sensing radiation brightness temperature is given, calibrating the microwave remote sensing radiation brightness temperature, or else, reading the microwave remote sensing radiation brightness temperature, longitude and latitude directly;
    if a calibration coefficient of the infrared remote sensing radiation brightness temperature is given, calibrating the infrared remote sensing radiation brightness temperature, or else, reading the infrared remote sensing radiation brightness temperature, longitude and latitude directly; and
    if a calibration coefficient of visible light remote sensing reflectivity data is given, calibrating the visible light remote sensing reflectivity, or else, reading the visible light remote sensing reflectivity, longitude and latitude directly.

4. The sea fog monitoring method according to claim 3, wherein,
    a process of gridding the visible light and infrared remote sensing data comprises:
    constructing an infrared remote sensing data grid, and filling the infrared remote sensing data grid with the infrared remote sensing radiation brightness temperature according to the corresponding longitude and latitude thereof; and
    constructing a visible light remote sensing data grid, and filling the visible light remote sensing data grid with the visible light remote sensing reflectivity according to the corresponding longitude and latitude thereof.

5. The sea fog monitoring method according to claim 3, wherein,
    a process of gridding the microwave remote sensing data comprises:
    constructing microwave remote sensing data, and filling the microwave remote sensing data with the microwave remote sensing radiation brightness temperature according to the corresponding longitude and latitude thereof.

6. The sea fog monitoring method according to claim 1, wherein,
    for the time-based daytime data in a certain region, when a reflectivity of a 650 nm channel is greater than 0.2 and a radiation brightness temperature of a 11.7 μm channel is greater than 270 K, it can be determined that the daytime sky conditions of the region are "fog, fog and low clouds, and low clouds", or else, the daytime sky conditions of the region are "clear sky or high clouds".

7. The sea fog monitoring method according to claim 1, wherein,
    for gridded nighttime infrared remote sensing data in a certain region, a difference $\Delta R$ between radiation values of dual channels is calculated by using a dual-channel difference method; when $\Delta R$ is greater than 2 K, it is determined that the nighttime sky conditions of the region are "fog, fog and low clouds, and low clouds", or else, the nighttime sky conditions of the region are "clear sky or high clouds".

8. The sea fog monitoring method according to claim 1, wherein,
    Laplace operator calculation is performed on the infrared remote sensing data of the "fog, fog and low clouds, and low clouds" region, and threshold analysis is performed on the obtained operator, when the obtained operator is greater than 0.1, it is determined that there are low clouds in a region, or else, there is no low cloud in the region.

9. The sea fog monitoring method according to claim 1, wherein, the three-dimensional temperature and humidity field of the "low clouds, low clouds and fog" region is selected to calculate a relative humidity distribution of each layer by means of the temperature and humidity corresponding to a same atmospheric stratification, and whether there is fog in the region is determined according to relative humidity.

\* \* \* \* \*